Oct. 15, 1929.                 C. E. TANNEWITZ                 1,731,599

BAND SAW WHEEL

Filed Sept. 15, 1927

INVENTOR
Carl E. Tannewitz
BY
Chappell & Earl
ATTORNEYS

Patented Oct. 15, 1929

1,731,599

UNITED STATES PATENT OFFICE

CARL E. TANNEWITZ, OF GRAND RAPIDS, MICHIGAN

BAND-SAW WHEEL

Application filed September 15, 1927. Serial No. 219,632.

The main objects of this invention are:

First, to provide an improved band saw wheel having a resilient tread or facing which is effectively secured to the wheel so that it is not likely to be thrown off or to loosen in use, and also is quite effectively protected so that it is not likely to be injured by a broken band saw.

Second, to provide a structure embodying these advantages in which the facing may be quickly removed and replaced and at the same time is very secure.

Third, to provide a structure having these advantages which is very economical in its parts.

Objects pertaining to details and economies of my invention will appear from the description to follow. The invention is defined in the claims.

A structure embodying the features of my invention is clearly illustrated in the accompanying drawing, in which.

Figure 1:
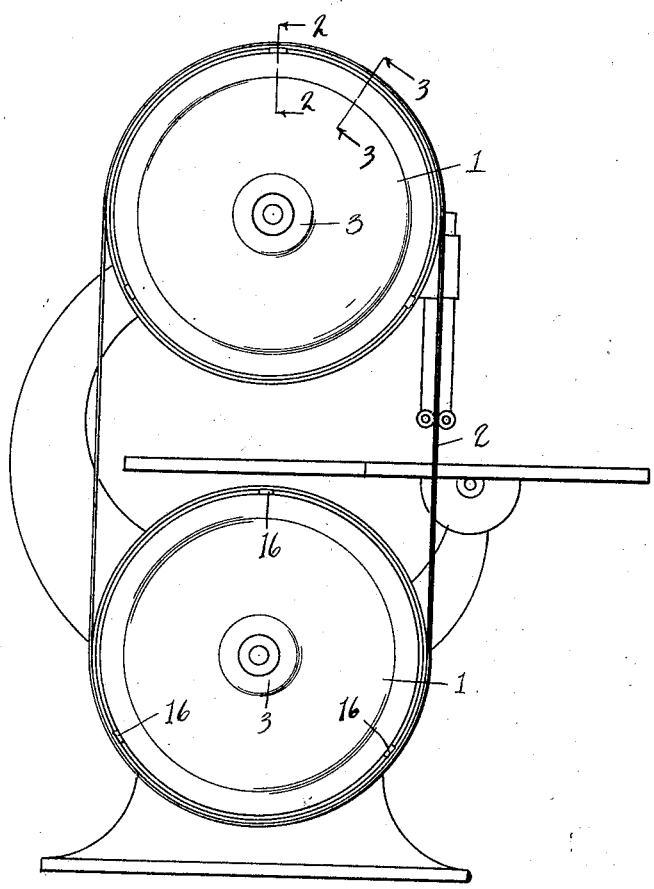
Fig. 1 is a side elevation of a band saw embodying the features of my invention, the parts being shown mainly in conventional form.
Figure 4:
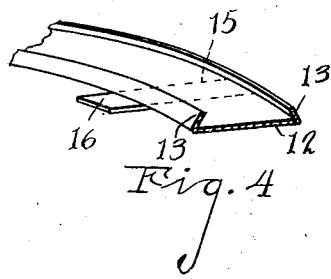
Fig. 4 is a fragmentary perspective view of the wheel.
Figure 5:
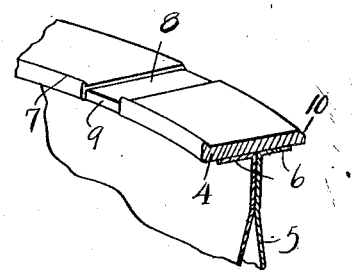
Fig. 5 is a fragmentary perspective view of the band saw wheel with the facing removed.
Figure 2:
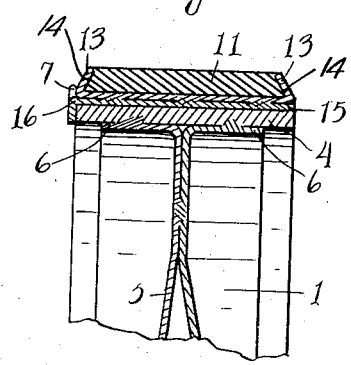
Fig. 2 is a vertical enlarged detail section on line 2—2 through one of the band saw wheels.
Figure 3:
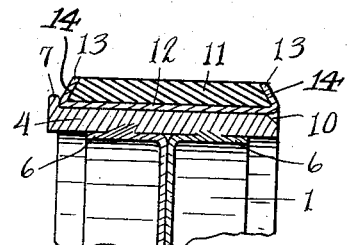
Fig. 3 is a detail section on line 3—3 of one of the band saw wheels.

Referring to the drawing, 1, 1 represent the band saw wheels and 2 the band saw. The other portions of the machine are shown merely to illustrate the relation of the parts in use.

The wheel proper is as illustrated that of my Patent No. 1,645,552, granted October 18, 1927, and comprises a hub 3, a metal rim 4 and outwardly converging disks 5 having outturned flanges 6 at their outer edges fitting within and spot welded to the inner side of the rim. The rim is provided with a peripheral bead or flange 7 at one edge and peripheral transverse key way grooves 8 which extend through the flanged edge of the rim forming the recesses 9 in the edge of the rim. The opposite edge of the rim is beveled at 10.

The tread or facing 11 is formed of rubber in the form of a tire and this is mounted in a holder 12 of channel cross section, the flanges 13 of the tire being turned inwardly to engage the beveled or inclined edges 14 of the facing. The facing is also cemented or glued into the holder.

This facing is of such diameter that it is a close fit on the rim, some force being required to remove or replace it from the rim. The edge of the rim is beveled to facilitate centering and guiding the holder upon the rim.

To the inner side of the holder I secure a plurality of transverse keys 15 having projecting ends 16 at one side adapted to be folded downward into the recesses 9, thereby locking the holder upon the rim. The tire or facing 11 is thus very securely retained so that it is quite impossible for it to be thrown from the wheel.

Heretofore attempts have been made to cement the facings directly to the rim but this is not satisfactory, and to vulcanize the facing to the rim requires that the wheels be sent to a rubber factory or a plant especially equipped for the purpose.

By my improvements the treads are effectively retained, experience having demonstrated that they do not loosen when ordinary care is used in mounting the same in the holders. When worn the holders may be quickly removed and a new facing holder applied to the wheel so that there is a minimum of delay in operation of the machine. At the present time machines of this character are operated at very high speeds in factories for trimming metal parts and my improved wheel is especially well adapted for high speeds as the facing is not only effectively retained but the wheels are light in weight and very strong.

A further advantage is that in the event of breaking of the band saw, which is a frequent occurrence where the machines are used for trimming metal parts, the saw cannot become entangled with the wheel and the facing is protected by the overlapping edges of the holder.

I have illustrated and described my improvements in an embodiment which I have found highly satisfactory. I have not attempted to describe certain modifications or adaptations which might be desirable in machines designed for other uses as it is believed this disclosure will enable those skilled in the art to embody or adapt my improvements as may be desired.

Having thus described my invention what I claim as new and desire to secure by Letters Patent is:

1. The combination in a band saw, of a band saw wheel provided with a rim having a flange at one edge and a plurality of transverse grooves extending through said flange and across the edge of the rim, a facing of resilient material, an annular facing holder of channel cross section having inwardly inclined flanges overlying the edges of said facing, the facing being cemented in said holder, and bendable keys disposed transversely on the inner side of said facing holder to engage said grooves, the ends of said keys being bent downwardly into the grooves at the edge of the rim.

2. The combination of a band saw wheel provided with a rim having an outwardly projecting flange at one edge and transverse key ways extending across the periphery and the flanged edge of the rim, a facing, an annular facing holder of channel cross section in which said facing is secured, the flanges of said holder being turned inwardly, and bendable keys secured on the inner side of said holder to engage said key ways for detachably securing said facing holder upon the rim.

3. The combination in a band saw, of a band saw wheel provided with a rim beveled at one edge and having a flange at the other edge and a plurality of transverse grooves extending through said flange and across the edge of the rim, a facing, an annular facing holder of channel cross section, and bendable keys disposed transversely on the inner side of said facing holder to engage said grooves, the ends of said keys being bent downwardly into the grooves at the edge of the rim.

4. The combination of a band saw wheel provided with a rim having an outwardly projecting flange at one edge and transverse key ways extending across the periphery and the flanged edge of the rim, a resilient facing, an annular facing holder of channel cross section in which said facing is secured, and keys secured on the inner side of said holder to engage said key ways for detachably securing said facing holder upon the rim.

5. The combination in a band saw wheel of a rim having an outwardly projecting flange at one edge and transverse key ways, a facing, and an annular channel-shaped holder for said facing having a plurality of keys secured on its inner side to engage said key ways and bendable to engage the edge of the rim.

6. The combination in a band saw, of a band saw wheel provided with a rim, a facing of resilient material, an annular facing holder having inturned flanges at its edges embracing and overlying the edges of said rim, said facing being cemented within said channel, and means for detachably securing said holder upon said rim.

7. The combination in a band saw wheel, of a rim beveled at one edge and having an outwardly projecting flange at the other edge and transverse key ways, a facing, and an annular channel-shaped holder for said facing having a plurality of keys engaging said key ways and bendable to engage the rim.

8. The combination in a band saw, of a band saw wheel provided with a rim, a facing of resilient material, an annular facing holder having inturned flanges at its edges embracing and overlying the edges of said facing, and means for detachably securing said holder upon said rim.

In witness whereof I have hereunto set my hand.

CARL E. TANNEWITZ.